United States Patent Office 2,718,456
Patented Sept. 20, 1955

2,718,456

HEXAFLUOROPHOSPHORIC ACID COMPOSITIONS AND PREPARATION THEREOF

Albertus J. Mulder and Willem C. Brezesinska Smithuysen, Amsterdam, Netherlands, assignors to Shell Development Company, Emeryville, Calif., a corporation of Delaware No Drawing. Application March 17, 1952,
Serial No. 277,086

11 Claims. (Cl. 23—139)

This invention relates to anhydrous hexafluorophosphoric acid compositions and the preparation thereof.

Heretofore it has been considered that hexafluorophosphoric acid could exist only as a hydrate (solid or in aqueous solution) and that it is incapable of independent existence in the anhydrous state. It is known to produce the hydrate of the acid by passing gaseous phosphorus pentafluoride through a cooled solution of hydrogen fluoride in water (U. S. Patent 2,488,298). Attempts to remove the hydrate water in order to obtain the anhydrous hexafluorophosphoric acid have resulted in the formation of hydrogen fluoride and phosphorus pentafluoride, but not of the anhydrous acid. Furthermore, heretofore it has been considered that hydrogen fluoride and phosphorus pentafluoride do not react on each other in the anhydrous state.

It is a principal object of this invention to prepare anhydrous hexafluorophosphoric acid. It is another object to provide an anhydrous hexafluorophosphoric acid-containing composition. A still further object is to provide an efficient and effective method for the preparation of hexafluorophosphoric acid in an anhydrous condition.

It has now been found that phosphorus pentafluoride and hydrogen fluoride can be brought into reaction with each other in an anhydrous state in the presence of a suitable inorganic solvent for both the phosphorus pentafluoride and hydrogen fluoride, which solvent at temperatures below the boiling point thereof is essentially non-reactive with the two reactants and is sufficiently polar to be an ionizing medium for hydrogen fluoride. This solvent should have a normal boiling point no higher than about 80° C., and preferably no higher than (i. e. below) about 20° C., in order that its removal from the reaction mixture by distillation can be readily effected. Its boiling point should not be lower than about −80° C. and preferably no lower than about −50° C. in order that it can be liquefied without too great difficulty, and its melting point should not be higher (i. e., should be lower) than about −50° C., preferably not higher than about −70° C., so that low temperatures can be used without the danger of solidification of the solvent. In order to exclude reaction of the solvent with either one of the reactants, the solvent must not be basic in character, and must not contain sulfide-sulfur. On the other hand, the substance of the solvent should possess slightly acidic characteristics and in the liquid state it should possess the properties of an ionizing medium. It will be understood that the more restricted conditions of volatility will apply when it is desired to recover the $HPF_6$ from the reaction mixture free from the reaction medium.

The substances which possess the requisite properties to be suitable for the practice of the invention are quite limited in number, being essentially oxides of sulfur and carbon and oxyhalides of sulfur and carbon wherein the halogen has an atomic number from 9 to 17. Sulfur dioxide is particularly preferred as the reaction medium, because of its effectiveness, its miscibility with hydrogen fluoride in all ratios, without any reaction therewith, its high solvency for $PF_5$ and non-reactivity therewith, the ease with which it is liquefied, and the ease with which it is liquefied, and the ease with which it is removed from the reaction mixture by distillation even at atmospheric pressure. Other suitable substances are thionyl fluoride ($SOF_2$), thionyl chloride ($SOCl_2$), sulfuryl fluoride ($SO_2F_2$), sulfuryl chloride ($SO_2Cl_2$), carbon dioxide, carbonyl chloride ($COCl_2$), and carbonyl sulfide ($COS$). The oxy-sulfur compounds, including sulfur oxyhalides of fluorine and chlorine, constitute the preferred sub-class of solvents for practicing the invention.

A highly suitable method for carrying out the reaction of hydrogen fluoride and phosphorus pentafluoride in accordance with the invention is to pass gaseous phosphorus pentafluoride through a liquid mixture of hydrogen fluoride and the selected solvent, sulfur dioxide being particularly suitable for this purpose. The temperature to be used can be chosen from a wide range, as already indicated by the properties of suitable solvents. The lower limit is the temperature at which the reaction mixture is still just liquid. Temperatures above room temperature are less attractive, on account of the decreasing stability of the hexafluorophosphoric acid and increasing vapor pressures at increasing temperatures. In principle, however, the reaction can be carried out above 20° C. Preferred temperatures lie between about −40° C. and about −15° C. It is also important that the solvent, e. g., sulfur dioxide, be present in sufficient quantities. When the introduction of the phosphorus pentafluoride takes place at −20° C., suitable ratios by weight of solvent to HF, particularly of $SO_2$:HF, are at and above about 1:1. At a lower temperature less solvent suffices than corresponds to this ratio. The higher the temperature, the more solvent is necessary in ratio to the quantity of the HF.

When sulfur dioxide is used as the reaction medium, it is a simple matter to determine whether sufficient $PF_5$ is being introduced into the reaction mixture to bind all of the HF. For this purpose, a washing vessel containing a very dilute solution of malachite green in water can be connected after the reaction apparatus and in series therewith. When $PF_5$ passes through the reaction apparatus without being bound (reacted with HF), the green color of the malachite green disappears. Neither the HF nor the $SO_2$ affects the malachite green.

After the reaction has taken place, the solvent can be removed from the reaction mixture by simple distillation. At atmospheric pressure this distillation can take place at about 0° C., in the case of sulfur dioxide and solvents of about equal or greater volatility. With less volatile solvent reduced pressure is advantageously employed to avoid excessive temperatures. Hexafluorophosphoric acid remains behind in the form of an oily, colorless liquid. When exposed to the atmosphere this liquid fumes strongly; at room temperature (25° C. or higher) it decomposes to HF and $PF_5$ with considerable rapidity.

The following is a detailed description of an illustrative preparation of hexafluorophosphoric acid by the interaction of hydrogen fluoride dissolved in liquid sulfur dioxide with phosphorus pentafluoride. First, $SO_2$ was passed through concentrated $H_2SO_4$ to remove any traces of sulfur trioxide; it was then dried over phosphorus pentoxide and then distilled into a V2A steel bomb. The bomb stood in an insulated cooling bath filled with alcohol-carbon dioxide with a temperature of −20° C. The amount of $SO_2$ was about one mol proportion (about 60 parts by weight). Next, about three mol proportions (about 60 parts by weight) of anhydrous hydrogen fluoride were distilled into the same bomb, thus yielding a single phase solution of liquid $SO_2$ and HF in a weight ratio of $SO_2$ to HF of about 1:1 (for the purpose of expressing mol proportions, the formula HF is assumed for hydrogen fluoride, although it is understood that it may be in an associated state such as represented by the formula $H_2F_2$). The bomb containing the $SO_2$—HF solution was then connected to a V2A steel retort via a cooling spiral. The retort had previously been charged with an intimate mixture of equal parts by weight of moisture-free chemically pure calcium fluoride and chemically pure phosphorus pentoxide. The temperature of the bomb and contents was lowered to —40° C. and the bomb connected to a washing bottle containing a dilute solution of malachite green in water. The latter served as indicator for $PF_5$, decolorizing the malachite green, as it also does methylene blue, which $SO_2$ and HF do not. After proper line purging, as will be understood, to avoid contamination with moisture, the retort was heated, first slowly, then more briskly and finally red-hot, with the liberation of $PF_5$ from the $CaF_2$—$P_2O_5$ reaction mixture, which was passed through the cooling coil and into the $SO_2$—HF solution in the bomb. When sufficient $PF_5$ with a slight excess had been absorbed (perceptible by the rapid decolorizing of malachite green solution), the bomb was disconnected and the contents forced from it into a V2A steel flask, being a solution of hexafluorophosphoric acid ($HPF_6$) in liquid sulfur dioxide. The flask and contents were allowed to warm to about 0° C. and the $SO_2$ evaporated therefrom. When all the $SO_2$ had evaporated, the residue was an oily, colorless liquid that fumed strongly when exposed to moist air and dissociated at considerable rate into HF and $PF_5$ at room temperature (about 25—30° C.).

The acid value of the recovered product was determined and found to be 375, the theoretical value being 384, thus indicating a purity of about 98% $HPF_6$. In order further to establish the identity of the product, it was combined in aqueous solution with pyridine and the precipitate filtered off and analyzed. The analysis corresponded to that of the compound of pyridine with hexafluorophosphoric acid ($C_5H_5NHPF_6$), already described by Lange and Müller, Berichte 63 B, 1058 (1930).

Instead of effecting the preparation of the hexafluorophosphoric acid by conducting $PF_5$ into a solution of HF in the solvent, HF vapor can also be passed into a solution of $PF_5$ in the solvent, or liquid HF can be added to the $PF_5$-solvent solution. Also, HF and $PF_5$ can be added simultaneously to the solvent.

As the acid is highly corrosive in a free state and dissociates very rapidly at room temperature into $PF_5$ and HF, it is advantageously kept dissolved in one of the solvents of this invention, particularly in liquid sulfur dioxide, in a suitable vessel, such as a V2A steel bomb. The acid is readily recovered from such solution when and as required, as already described. Furthermore, for many of its applications, it is advantageously utilized while dissolved in the solvent. In some cases the solvent, such as $SO_2$, functions merely as a diluent or inert medium for the application, whether it involves chemical reaction or is based entirely on physical changes, or both, while in other cases the solvent is utilized simultaneously to take advantage of its own chemical or physical properties or both. The anhydrous $HPF_6$ of this invention can be used to prepare aqueous solutions thereof corresponding to those already known, for the many known applications thereof. On the other hand, the anhydrous $HPF_6$, alone or in solution in the solvents as described herein for use in its preparation, is useful as condensing or polymerizing or esterifying catalyst in organic reactions which are advantageously carried out under anhydrous conditions. The solvent solutions of $HPF_6$, e. g., liquid $SO_2$ solution of $HPF_6$, which are produced in the practice of this invention, are particularly valuable for catalyzing various reactions under anhydrous conditions where a non-oxidizing agent which possesses strongly acidic properties and an ionizing medium are required.

We claim as our invention:

1. A process for the preparation of anhydrous hexafluorophosphoric acid, which comprises effecting reaction of hydrogen fluoride with phosphorus pentafluoride in anhydrous liquid sulfur dioxide.

2. A process in accordance with claim 1, wherein gaseous phosphorus pentafluoride is passed into an anhydrous liquid mixture of hydrogen fluoride and sulfur dioxide.

3. A process in accordance with claim 1, wherein the reaction is effected at a temperature of from about —30° to about —15° C.

4. A process in accordance with claim 1, wherein the sulfur dioxide is subsequently distilled from the hexafluorophosphoric acid.

5. An anhydrous composition comprising a solution of hexafluorophosphoric acid dissolved in liquid sulfur dioxide.

6. An anhydrous composition comprising a solution of hexafluorophosphoric acid dissolved in liquid sulfuryl fluoride.

7. An anhydrous composition comprising a solution of hexafluorophosphoric acid dissolved in liquid thionyl fluoride.

8. An anhydrous composition comprising a solution of hexafluorophosphoric acid in a liquid solvent selected from the group consisting of oxides and oxy halides of carbon and of sulfur wherein the halide has an atomic number of from 9 to 17.

9. A process for the preparation of anhydrous hexafluorophosphoric acid which comprises effecting reaction of hydrogen fluoride with phosphorus pentafluoride in an anhydrous liquid solvent selected from the group consisting of oxides and of oxyhalides of carbon and of sulfur wherein the halides each have an atomic number of from 9 to 17.

10. A process in accordance with claim 9, wherein the solvent has a boiling point below about 20° C. and a melting point below about —50° C.

11. A process in accordance with claim 9, wherein the solvent is an oxy-sulfur compound.

References Cited in the file of this patent

UNITED STATES PATENTS

| | | |
|---|---|---|
| 2,488,298 | Lange et al. | Nov. 15, 1949 |
| 2,488,299 | Lange et al. | Nov. 15, 1949 |
| 2,569,092 | Deering | Sept. 25, 1951 |
| 2,596,498 | Mavity | May 13, 1952 |

FOREIGN PATENTS

| | | |
|---|---|---|
| 812,247 | Germany | Aug. 27, 1951 |